Jan. 10, 1950

T. S. GADZINSKI ET AL 2,494,384

FISHING LURE

Filed Dec. 14, 1948

Inventors
Thaddeus S. Gadzinski
Zigmund F. Gadzinski

By Clarence A. O'Brien
and Harvey B. Jacobson
Attorneys

Jan. 10, 1950 T. S. GADZINSKI ET AL 2,494,384
FISHING LURE

Filed Dec. 14, 1948 2 Sheets-Sheet 2

Inventors
Thaddeus S. Gadzinski
Zigmund F. Gadzinski

By Clarence A. O'Brien
and Harvey B. Jacobson
Attorneys

Patented Jan. 10, 1950

2,494,384

UNITED STATES PATENT OFFICE 2,494,384

FISHING LURE

Thaddeus S. Gadzinski and Zigmund F. Gadzinski, Hamtramck, Mich.

Application December 14, 1948, Serial No. 65,102

3 Claims. (Cl. 43—42.22)

This invention relates to a novel fishing lure or plug and has for its primary object to provide a lure which will stay on the surface of the water and move to and fro with a quick jerking action.

Another object of this invention is to provide a novel fishing lure or plug which can be submerged adjustably to different depths.

A still further object of the invention is to provide a plug or lure including means for adjustably securing spoons thereto. A flexible spoon may be employed so that the angle of deflection may be adjusted as desired or a number of rigid spoons having different deflecting surfaces may be adjusted upon the lure body.

Yet another object of this invention is to provide a plug or lure of the character described to which a discerptible propeller may be attached for imparting motion to the lure.

A still further object of this invention is to provide a plug or lure of the character described which may be readily adjusted to impart varying motion to the lure without removing the lure from the fishing line.

These, together with various ancillary objects and features of the invention which will later become apparent as the following description proceeds, are attained by the device, a preferred embodiment of which has been illustrated, by way of example only, in the accompanying drawings, wherein.

Specific reference will now be made to the drawings. In the several views, in the accompanying drawings and in the following specification, similar reference characters indicate corresponding elements throughout.

Indicated generally at 10 is a lure body preferably in the shape of a fish having eye hooks 12 for supporting either a fishing hook or a weight. One end of the lure body 10 is provided with a further eye hook 14 having spaced, oppositely disposed arcuated washers 16 and 18 thereon.

Figure 7:
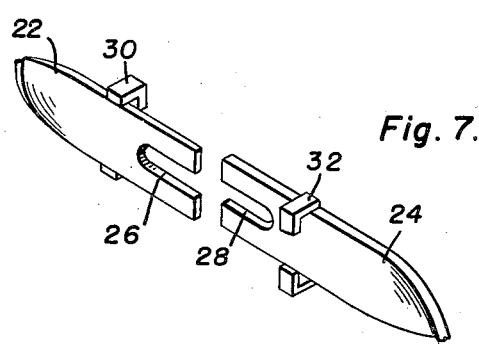
Figure 7 is a fragmentary perspective view of the propeller shown in Figure 3.

A propeller 20 is provided which, as shown in Figure 7, consists of an upper member 22 and a lower member 24, twisted in a conventional manner, the inner ends of which are bifurcated to produce open elongated slots 26 and 28, respectively. Positioned about the side edges of the upper members 22 and 24 are substantially C-shaped retaining brackets 30 and 32, respectively. As will be readily understood, the upper member 22 and the lower member 24 of the propeller are positioned about the eye hook 14 between the washers 16 and 18 so that the eye hook extends through the elongated slots 26 and 28. Thereafter, the upper member 22 and the lower member 24 are slid toward each other so that the bifurcated end of the upper member is clampingly retained in the bracket 32, while the bifurcated end of the lower member is clampingly retained in the bracket 30. Thus, it will be seen that the propeller can be positioned upon the eye hook 14 and removed therefrom quickly and easily.

The under surface of the lure body is provided with an L-shaped recess or cutout 34 adjacent its forward end for receiving an L-shaped anchor plate 36. The anchor plate 36 is provided with spaced apertures 38 for receiving recessed screws 40 which extend into the lure body for removably securing the anchor plate to the lure body 10. The lure body is further provided with a pair of arcuated recesses 42 for receiving the wings 44 of a wing nut 46 for a purpose to be later described.

Figure 1:
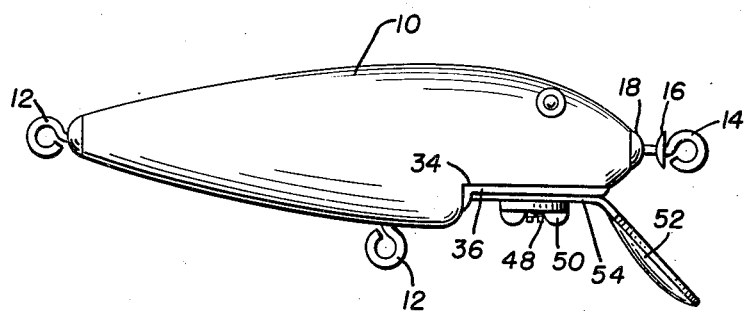
Figure 1 is a side elevational view of the lure with a spoon adjusted thereon.
Figure 2:
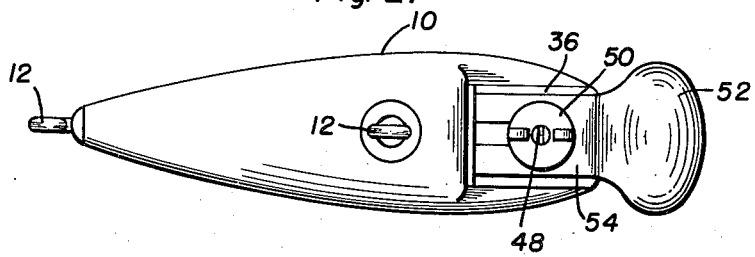
Figure 2 is a bottom plan view of the lure shown in Figure 1.
Figure 3:
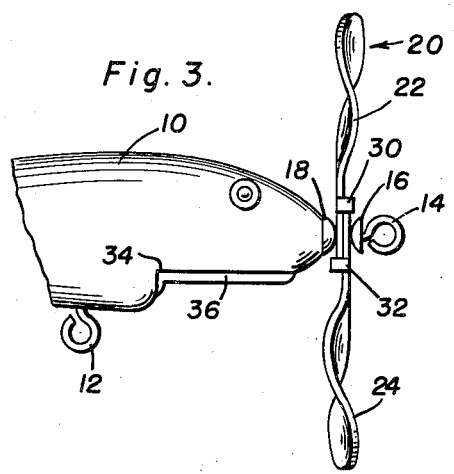
Figure 3 is a fragmentary side elevational view of the lure with the spoon removed and a propeller positioned at one end thereof.
Figure 4:
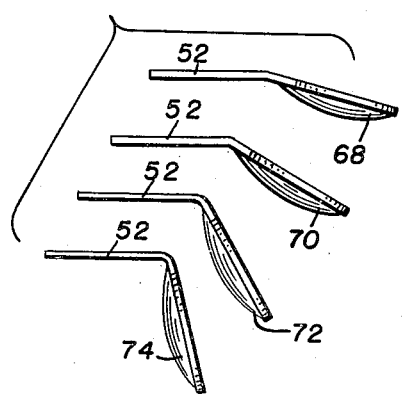
Figure 4 is a group view in elevation showing spoons having different deflecting surfaces.
Figure 5:
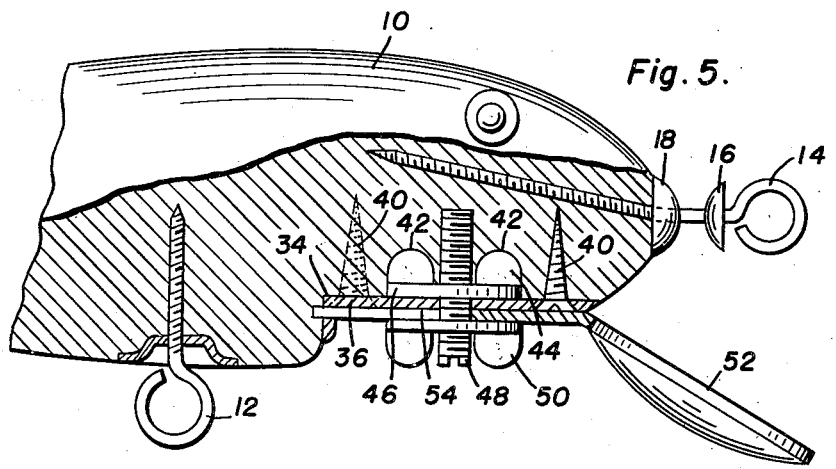
Figure 5 is a fragmentary longitudinal sectional view through the lure shown in Figure 1.
Figure 6:
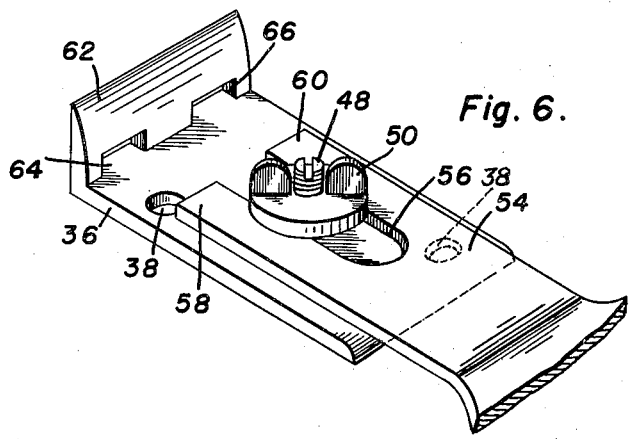
Figure 6 is a fragmentary perspective view of the anchor plate and the shank of the spoon secured thereto.

Extending into the lure body and through the wing nut 46 is a threaded bolt 48 which further extends through an aperture in the anchor plate 36 and upon the free end of which is retained a further wing nut 50. A spoon 52 is provided having a shank 54 which is bifurcated at its free end to produce an elongated open slot 56 and furcations 58 and 60. As will be seen clearly from Figure 6, the slot 56 straddles the bolt 48 and the shank 54 is positioned at the slotted end between the anchor plate 36 and the wing nut 50. Thus, it will be seen that the spoon 52 is both longitudinally and rotatably adjustable upon the anchor plate 36. To brace the spoon 52 on the anchor plate 36 against rotation, the shorter leg 62 of the anchor plate is provided with spaced longitudinally extending slots or openings 64 and 66 for receiving the furcations 58 and 60 of the spoon shank 54.

As will be readily understood, the spoon 52 may be made of flexible material so that the arcuated portion thereof may be bent to different angles of deflection as shown at 68, 70, 72, and 74. It will also be understood that if one desires to use a rigid spoon, spoons having different angular deflecting surfaces can be readily positioned upon the anchor plate and interchanged thereon.

Thus, it will be seen that a novel fish lure is provided in which the bobbing action of the lure can be adjustably varied without removing the lure from the fish line.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. In a fish lure; an anchor plate, means for removably retaining said anchor plate on the lure body, a deflecting spoon, means for adjustably retaining said spoon upon said anchor plate, and a bracing means on said anchor plate for retaining said spoon in a fixed position thereon, said deflecting spoon including a bifurcated shank and said second-named means including a threaded bolt extending through said anchor plate and lure body between the furcations of said shank, and a nut received on the free end of said bolt, said anchor plate being substantially L-shaped and said bracing means including slots in the shorter leg of said anchor plate for receiving the furcations of said spoon shank.

2. The combination of claim 1 and a wing nut received in the lure body behind said anchor plate serving as a bearing for said bolt.

3. In a fish lure; an anchor plate, means for removably retaining said anchor plate on the lure body, a deflecting spoon, means for adjustably retaining said spoon upon said anchor plate, and a bracing means on said anchor plate for retaining said spoon in a fixed position thereon, said deflecting spoon including a bifurcated shank, said anchor plate being substantially L-shaped, and said bracing means including slots in the shorter leg of said anchor plate for receiving the furcations of said spoon shank.

THADDEUS S. GADZINSKI.
ZIGMUND F. GADZINSKI.

REFERENCES CITED

The following references are of record in the file of this patent:

UNITED STATES PATENTS

| Number | Name | Date |
|---|---|---|
| 865,676 | Brown | Sept. 10, 1907 |
| 1,233,507 | Reynolds | July 17, 1917 |
| 1,423,025 | Rodgers et al. | July 18, 1922 |
| 1,474,823 | Hines | Nov. 20, 1923 |
| 1,542,404 | Paulson | June 16, 1925 |
| 1,713,998 | Comstock | May 21, 1929 |